United States Patent
Nusier et al.

(10) Patent No.: US 10,059,382 B2
(45) Date of Patent: *Aug. 28, 2018

(54) METHOD AND APPARATUS FOR ATTACHING A CRUSHABLE CARBON FIBER REINFORCED POLYMER STRUCTURE TO THE OUTER SURFACE OF A BATTERY ENCLOSURE

(71) Applicant: FORD GLOBAL TECHNOLOGIES, LLC, Dearborn, MI (US)

(72) Inventors: Saied Nusier, Canton, MI (US); William L. Stanko, Canton, MI (US); Saeed David Barbat, Novi, MI (US); Mohamed Ridha Baccouche, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/492,098

(22) Filed: Apr. 20, 2017

(65) Prior Publication Data

US 2017/0217503 A1 Aug. 3, 2017

Related U.S. Application Data

(62) Division of application No. 14/619,361, filed on Feb. 11, 2015, now Pat. No. 9,662,997.

(51) Int. Cl.
*H01M 2/10* (2006.01)
*B62D 29/00* (2006.01)
(Continued)

(52) U.S. Cl.
CPC .............. *B62D 29/005* (2013.01); *B60K 1/04* (2013.01); *B62D 21/155* (2013.01); *B62D 25/20* (2013.01);
(Continued)

(58) Field of Classification Search
CPC ............ H01M 2/1094; H01M 2220/20; B62D 29/005; B62D 21/155; B62D 25/20;
(Continued)

(56) References Cited

U.S. PATENT DOCUMENTS

| 2,671,599 A | 3/1954 | Price |
| 5,156,225 A | 10/1992 | Murrin |

(Continued)

FOREIGN PATENT DOCUMENTS

| CN | 102593399 | 7/2012 |
| CN | 103000835 | 3/2013 |

(Continued)

OTHER PUBLICATIONS

Espacenet.com machine translation of the detailed description of CN 103730616A (Apr. 16, 2014). (Year: 2014).*

*Primary Examiner* — Gregg Cantelmo
(74) *Attorney, Agent, or Firm* — Jason Rogers; Brooks Kushman P.C.

(57) ABSTRACT

A battery housing for a traction motor battery of a vehicle is disclosed that includes a plurality of elongated impact absorbing carbon fiber reinforced polymer members attached to the walls of the enclosure. The impact absorbing members may be corrugated members that have ridges and furrows connected by ramp surfaces that define trapezoidal spaces relative to the sides of the enclosure. The ridges are designed to be deformed into the trapezoidal space in the event of an impact to absorb impact forces and protect the battery. The impact absorbing members may be retained by T-shaped guides on the outer surface of the walls of the enclosure or may be adhesively attached to the sides of the enclosure.

2 Claims, 4 Drawing Sheets

(51) Int. Cl.
  *B62D 25/20* (2006.01)
  *B62D 21/15* (2006.01)
  *B62D 27/02* (2006.01)
  *B60K 1/04* (2006.01)

(52) U.S. Cl.
  CPC ........ *B62D 27/026* (2013.01); *H01M 2/1094* (2013.01); *B60K 2001/0438* (2013.01); *B60Y 2306/01* (2013.01); *H01M 2220/20* (2013.01)

(58) Field of Classification Search
  CPC .............................. B62D 27/026; B60K 1/04; B60K 2001/0438; B60Y 2306/01
  See application file for complete search history.

(56) References Cited

U.S. PATENT DOCUMENTS

| | | | |
|---|---|---|---|
| 5,791,118 A * | 8/1998 | Jordan | B32B 3/28 52/783.11 |
| 6,279,300 B1 | 8/2001 | Simhaee | |
| 6,300,005 B1 | 10/2001 | Kump | |
| 7,572,550 B2 | 8/2009 | Saito et al. | |
| 8,573,647 B2 | 11/2013 | Enning | |
| 8,632,902 B2 | 1/2014 | Wendorf et al. | |
| 8,702,161 B2 | 4/2014 | Charbonneau et al. | |
| 9,656,571 B2 * | 5/2017 | Nusier | B60L 11/1879 |
| 9,821,678 B2 * | 11/2017 | Nusier | B60L 11/1879 |
| 2003/0124315 A1 | 7/2003 | Grochoski | |
| 2005/0200062 A1 * | 9/2005 | Maurer | F16F 7/08 267/144 |
| 2007/0026305 A1 | 2/2007 | Jeon et al. | |
| 2008/0124625 A1 | 5/2008 | Hock et al. | |
| 2009/0136843 A1 | 5/2009 | Yamamoto et al. | |
| 2012/0121946 A1 | 5/2012 | Eckstein et al. | |
| 2012/0183828 A1 | 7/2012 | van den Akker | |
| 2013/0236753 A1 | 9/2013 | Yue et al. | |
| 2014/0045024 A1 | 2/2014 | Waters | |
| 2014/0287297 A1 | 9/2014 | Reitzle et al. | |
| 2014/0338995 A1 * | 11/2014 | McLaughlin | B60R 16/04 180/68.5 |
| 2016/0233460 A1 | 8/2016 | Nusier et al. | |

FOREIGN PATENT DOCUMENTS

| | | | |
|---|---|---|---|
| CN | 203434226 | 2/2014 | |
| CN | 103730616 | 4/2014 | |
| DE | 102008059941 | 6/2010 | |
| DE | 102009053138 | 5/2011 | |
| DE | 102010024320 | 12/2011 | |
| DE | 102010043899 | 5/2012 | |
| DE | 102010050826 | 5/2012 | |
| DE | 102011120960 | 4/2013 | |
| DE | 102011118284 | 5/2013 | |
| DE | 102011120010 | 6/2013 | |
| DE | 102012012294 | 12/2013 | |
| DE | 102012015919 | 2/2014 | |
| ES | 2396407 | 2/2013 | |
| GB | 2186253 | 8/1987 | |
| JP | 60058330 A * | 4/1985 | |
| JP | 2010116175 A * | 5/2010 | |
| JP | 2010126804 | 6/2010 | |
| JP | 2012104467 A * | 5/2012 | .......... H01M 2/0287 |
| JP | 2013045715 | 3/2013 | |
| JP | 02013045715 | 3/2013 | |
| KR | 100210949 | 7/1999 | |
| TW | 201421776 | 6/2014 | |
| WO | 2012025166 | 3/2012 | |
| WO | 2012073439 | 6/2012 | |
| WO | 2013079080 | 6/2013 | |
| WO | 2013156732 | 10/2013 | |
| WO | 2013180611 | 12/2013 | |
| WO | 2014034020 | 3/2014 | |

* cited by examiner

METHOD AND APPARATUS FOR ATTACHING A CRUSHABLE CARBON FIBER REINFORCED POLYMER STRUCTURE TO THE OUTER SURFACE OF A BATTERY ENCLOSURE

REFERENCE TO RELATED APPLICATIONS

This application is a division of U.S. application Ser. No. 14/619,361 filed Feb. 11, 2015, now U.S. Pat. No. 9,662,997 issued May 30, 2017, the disclosure of which is hereby incorporated in its entirety by reference herein.

TECHNICAL FIELD

This disclosure relates to protective structures for battery enclosures for electric vehicle batteries.

BACKGROUND

Electric vehicles use batteries that are enclosed in an enclosure or housing that is assembled to the vehicle body. The battery may be assembled to the vehicle body at a location that is spaced from the front, rear and sides of the vehicle. For example, the battery may be assembled below the passenger compartment, in the trunk, in front of the passenger compartment or in a longitudinally extending tunnel.

The battery must be protected from damage in a collision. The battery housing may be tightly packed with lithium ion battery packs or other types of battery cells. Deformation of the battery housing is to be avoided to prevent intrusion of the housing into the area housing the battery cells. Intrusions into the battery housing may rupture of battery cells and spill the contents of the battery cells.

When the battery housing is assembled in a central location in the vehicle, e.g. beneath the passenger compartment, limited crush space is available between the side of the vehicle body and the battery enclosure. More crush space is available between the battery enclosure and the front or rear ends of the vehicle. In either situation, there is a long felt and unfulfilled need for an efficient and effective lightweight structure for absorbing energy from a collision that minimizes battery enclosure deformation. The structure must have limited package space requirements while providing added stiffness to the battery enclosure assembly including the impact absorbing structure.

Some approaches to protecting the battery enclosure have proposed adding beams and cross members on the battery enclosure or extending outboard of the battery enclosure. These approaches add weight to the vehicle and require additional space to package the beams and cross members. Added weight is to be avoided because added weight adversely affects fuel economy. Increasing packaging space requirements adversely affects vehicle design freedom.

The above problems and other problems are addressed by this disclosure as summarized below.

SUMMARY

According to one aspect of this disclosure, an enclosure for a battery is disclosed that includes a plurality of aluminum alloy enclosure walls disposed about the battery and a plurality of corrugated impact absorbing members made of carbon fiber reinforced polymer (CFRP) attached to the enclosure walls. The impact absorbing members have at least one ridge and a plurality of furrows that define a plurality of trapezoidal spaces between the impact absorbing members and the enclosure walls.

According to other aspects of the method, each of the impact absorbing members may include at least one ridge that is disposed parallel to the enclosure wall. A first ramp surface and a second ramp surface extend from the ridge to the furrows on opposite sides of the ridge and toward the enclosure wall at an angle. The enclosure may further comprise an attachment flange provided on a first side and a second side of the impact absorbing members that extend parallel to the enclosure walls. The attachment flange on the first side is connected to one of the first ramp surfaces and the attachment flange on the second side is connected to one of the second ramp surfaces.

The enclosure may further comprise a plurality of T-shaped guides attached to the enclosure walls that define receptacles for the impact absorbing members between two T-shaped guides. The T-shaped guides extend parallel to each other so that each of the attachment flanges of the impact absorbing members are disposed between one of the T-shaped guides and one of the enclosure walls. The impact absorbing members absorb an impact applied to the enclosure by collapsing into the trapezoidal spaces and towards the enclosure wall.

According to another aspect of this disclosure, an enclosure for a battery is disclosed that comprises a plurality of planar aluminum enclosure walls disposed about the battery and a plurality of planar impact absorbing members attached in a face-to-face orientation to substantially cover the enclosure walls.

The enclosure may further comprise a plurality of T-shaped guides attached to the enclosure walls that define receptacles for the impact absorbing members between two T-shaped guides that extend parallel to each other. The planar impact absorbing members include a first attachment flange and a second attachment flange that are disposed between one of the T-shaped guides and one of the enclosure walls. The planar impact absorbing members may be adhesively attached to the enclosure walls.

According to another aspect of this disclosure, a method is disclosed for providing an impact absorbing battery enclosure for a battery of a vehicle having a battery powered traction motor. The method comprises the steps of: providing a plurality of sides and a top side and a bottom side; assembling all of the sides together about the battery; and assembling a plurality of impact absorbing carbon fiber reinforced polymer members to the sides to form an impact absorbing assembly that encloses the battery enclosure.

According to other aspects of this disclosure as it relates to the method, the impact absorbing carbon fiber reinforced polymer members may be corrugated and have at least one ridge and a plurality of furrows that define a plurality of trapezoidal spaces between the impact absorbing members and the sides of the enclosure. Each of the impact absorbing carbon fiber reinforced polymer members may include the at least one ridge that is disposed parallel to the side of the enclosure and a first ramp surface and a second ramp surface that each extend from the at least one ridge to the furrows on opposite sides of the at least one ridge. The ramp surfaces extend toward the side of the enclosure at an angle to define a trapezoidal space with the side that the impact absorbing member is attached. The impact absorbing carbon fiber reinforced polymer members absorb an impact applied to the enclosure by collapsing into the trapezoidal spaces and towards the side of the enclosure.

According to other aspects of the method, the method may further comprise the steps of providing an attachment flange on a first side and a second side of the impact absorbing carbon fiber reinforced polymer members that extend parallel to the side of the enclosure and connecting the attachment flange on the first side and on the second side to one of the sides of the enclosure.

The method may further comprise providing a plurality of T-shaped guides on the side of the enclosure that define receptacles for the impact absorbing carbon fiber reinforced polymer members between two T-shaped guides that extend parallel to each other. Each of the attachment flanges of the impact absorbing carbon fiber reinforced polymer members may be inserted between one of the T-shaped guides and one of the sides of the enclosure.

The above aspects of this disclosure and other aspects are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
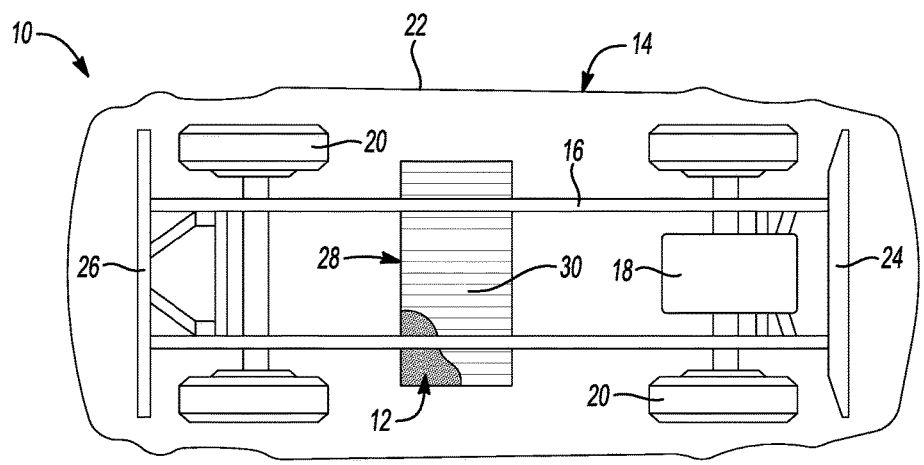
FIG. 1 is a diagrammatic bottom plan view of a vehicle illustrating a battery enclosure disposed on the vehicle frame beneath the passenger compartment.

Referring to FIG. 1, a vehicle 10 is diagrammatically illustrated with a battery 12 for a battery-powered traction motor. The vehicle 10 includes a body 14 that is supported on a frame 16. A traction motor 18 is also assembled to the frame 16. The traction motor 18 is a battery-powered traction motor that is powered by the battery 12 to drive the wheels 20. The body 14 includes a side body 22, a front bumper 24 and a rear bumper 26. The battery 12 is shown to be centrally located underneath the passenger compartment of the vehicle 10. It should be noted that there is a substantially greater amount of space between the battery and the front and rear bumper 24 and 26 compared to the relatively closer spacing of the side body 22 to the battery 12. Side impact collisions that result in driving the side body 22 toward the battery 12 present a greater challenge when designing impact absorbing elements for the battery 12 due to the reduced amount of crush space available between the side body 22 and the battery 12.

Figure 2:
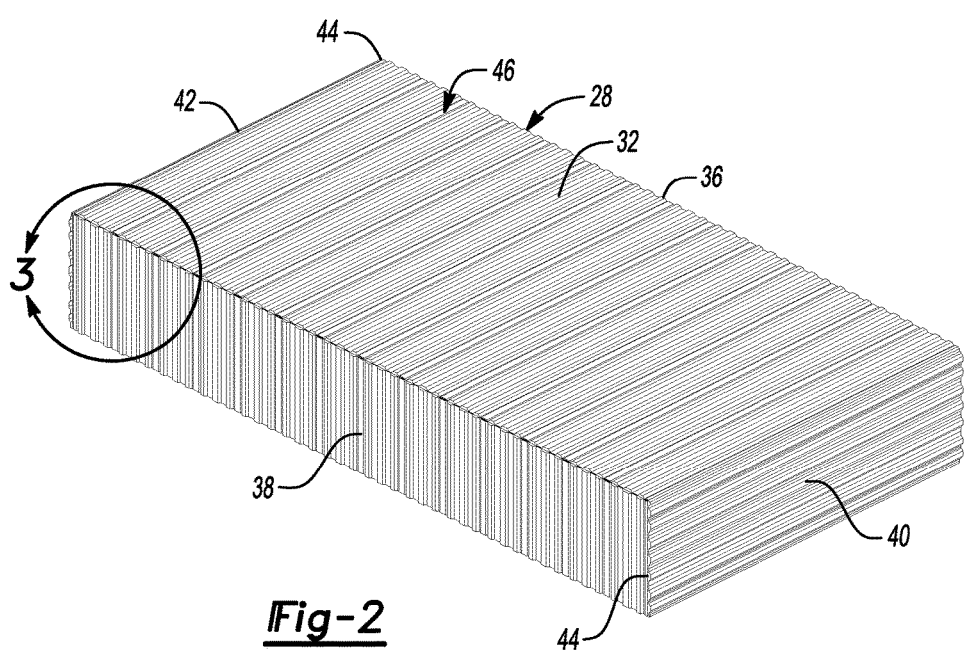
FIG. 2 is a perspective view of a first embodiment of a battery enclosure including corrugated carbon fiber reinforced polymer (CFRP) impact absorbing members provided on the sides and top of the enclosure.
Figure 3:
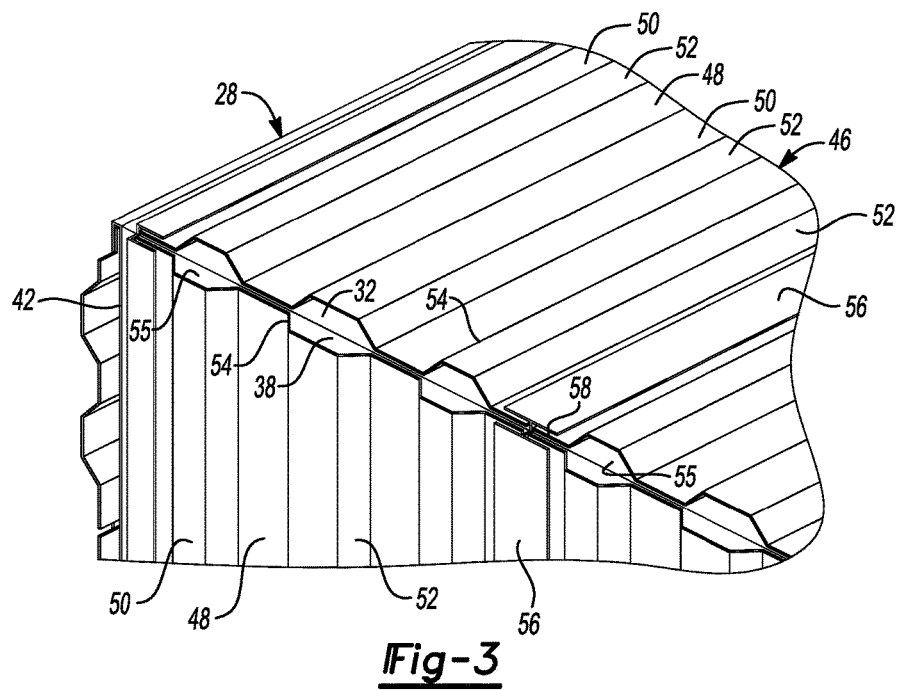
FIG. 3 is a fragmentary enlarged perspective view of a portion of the battery enclosure illustrated in FIG. 2.
Figure 4:
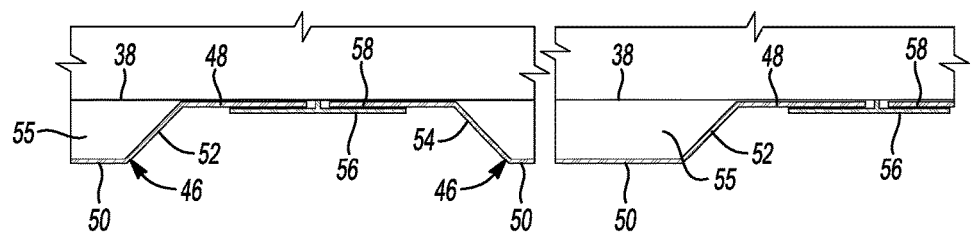
FIG. 4 is a fragmentary cross-sectional view of a portion of the battery enclosure illustrated in FIG. 2.

Referring to FIGS. 2-4, a first embodiment of the battery enclosure, generally indicated by reference numeral 28, is shown to include a bottom wall 30 (shown in FIG. 1) and a top wall 32. A front wall 36 faces the front bumper 24 (shown in FIG. 1) and a rear wall 38 faces the rear bumper 26 (shown in FIG. 1). The battery enclosure 28 includes a right side wall 40 and a left side wall 42. The side walls are joined at corners 44.

Impact absorbing members, generally indicated by reference numeral 46, are ribbed or corrugated carbon fiber reinforced polymer (CFRP) attachments 46 to the battery enclosure 28. The corrugated CFRP attachments 46 have alternating furrows 48 and ridges 50. The furrows 48 are planar areas that are adjacent to one the enclosure walls (38 in FIG. 4). The ridges 48 are planar areas that are spaced from one the enclosure walls. The ridges 50 and furrows 48 are connected by ramp surfaces 52 and 54 on a first and a second side of each ridge 50. The ridges 50 and furrows 48 define trapezoidal spaces 55 between the impact absorbing members and the enclosure walls.

The corrugated CFRP attachments 46 include carbon fiber reinforcing fibers that are oriented to extend substantially in the direction corresponding to the length of the corrugated CFRP attachments 46. The carbon fibers are oriented to extend parallel to the ridges 50 and furrows 48. The CFRP attachments substantially cover (understood to be at least 90% coverage) the sides of the enclosure. The carbon fibers are encapsulated in a polymer resin to form the corrugated CFRP attachments 46. In one example, the corrugated CFRP attachment may have a thickness of 2.0 mm.

T-shaped guides 56 are either assembled to the walls of the enclosure 28 or integrally molded with the walls of the enclosure 28. The T-shaped guides 56 are disposed to be parallel to the next adjacent T-shaped guides 56. The furrows 48 may be partially received between the enclosure wall and T-shaped guides, as shown in FIG. 4, to retain the impact absorbing members 46 on the enclosure 28. The portions of the furrows 48 that are received by the T-shaped guides may be referred to as attachment flanges 58. In one example that was tested in a simulation, the enclosure and T-shaped guides may be 1.0 mm thick aluminum alloy, such as AL6061-T6 and had a mass of 27 kg.

Figure 5:
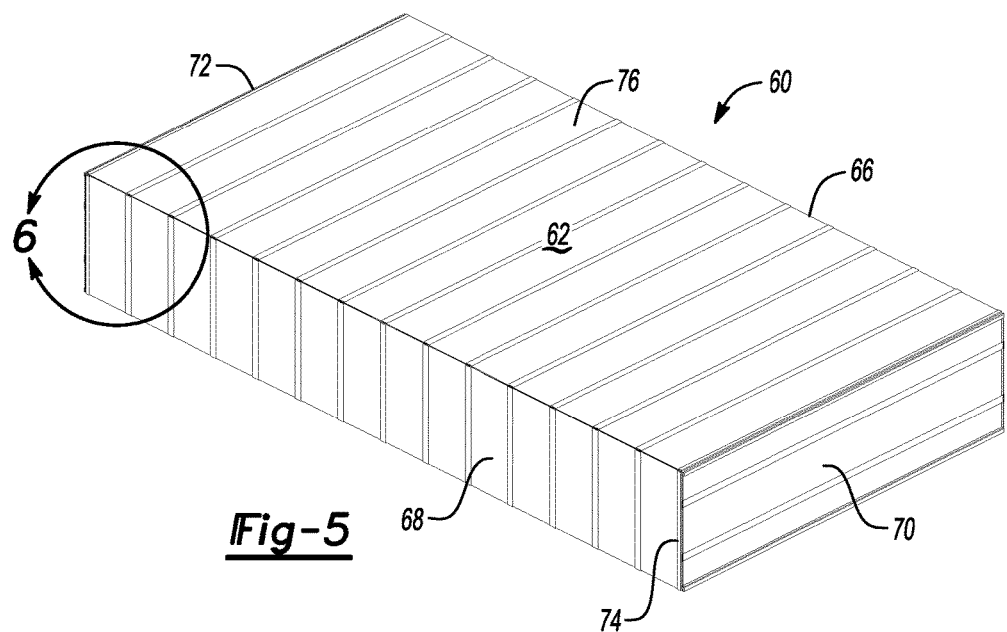
FIG. 5 is a perspective view of a second embodiment of a battery enclosure including planar carbon fiber reinforced polymer (CFRP) impact absorbing members provided on the sides and top of the enclosure.
Figure 6:
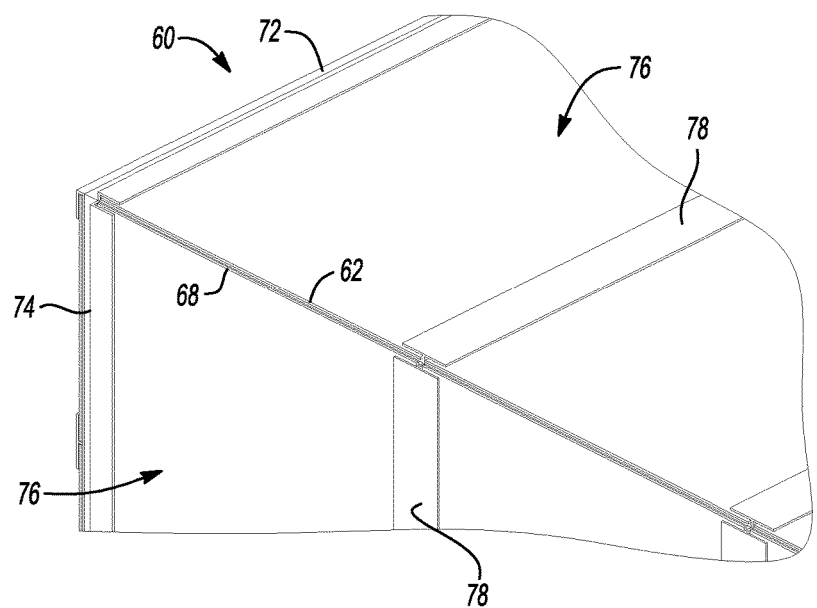
FIG. 6 is a fragmentary enlarged perspective view of a portion of the battery enclosure illustrated in FIG. 5.
Figure 7:
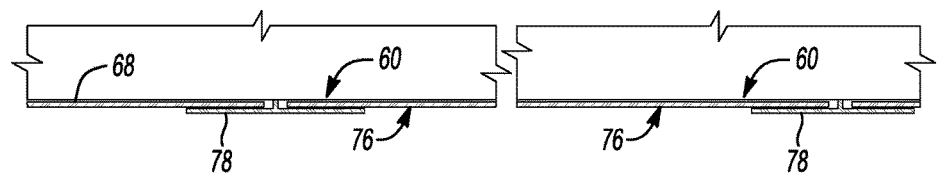
FIG. 7 is a fragmentary cross-sectional view of a portion of the battery enclosure illustrated in FIG. 5.

Referring to FIGS. 5-7, a second embodiment of the battery enclosure, generally indicated by reference numeral 60, is shown to include a bottom wall 30 (shown in FIG. 1) and a top wall 62. A front wall 66 faces the front bumper 24 (shown in FIG. 1) and a rear wall 68 faces the rear bumper 26 (shown in FIG. 1). The battery enclosure 60 includes a right side wall 70 and a left side wall 72. The side walls are joined at corners 74.

Impact absorbing members, generally indicated by reference numeral 76, are planar carbon fiber reinforced polymer (CFRP) attachments 76 to the battery enclosure 60. CFRP attachments 76 include carbon fiber reinforcing fibers that are oriented to extend substantially in the direction corresponding to the length of the corrugated CRFP attachments 76. The carbon fibers are encapsulated in a polymer resin to form the corrugated CRFP attachments 76. In one example, the corrugated CFRP attachments 46 may have a thickness of 2.0 mm. The CFRP attachments 46 substantially cover (understood to be 90% coverage) of the sides of the enclosure.

T-shaped guides 78 are either assembled to the walls of the enclosure 60 or integrally molded with the walls of the enclosure 60. The T-shaped guides 78 are disposed to be parallel to the next adjacent T-shaped guides 78. In one example, the enclosure and T-shaped guides may be 1.0 mm thick aluminum alloy, such as AL6061-T6 and had a mass of 27 kg. as tested.

The impact absorbing members 76 may be partially received between the enclosure wall and T-shaped guides, as shown in FIG. 7, to retain the impact absorbing members 46 on the enclosure 28. In one example, the enclosure and T-shaped guides may be 1.0 mm thick and formed of an aluminum alloy. Alternatively, the planar impact absorbing members may be adhesively attached to the enclosure walls.

Figure 8:
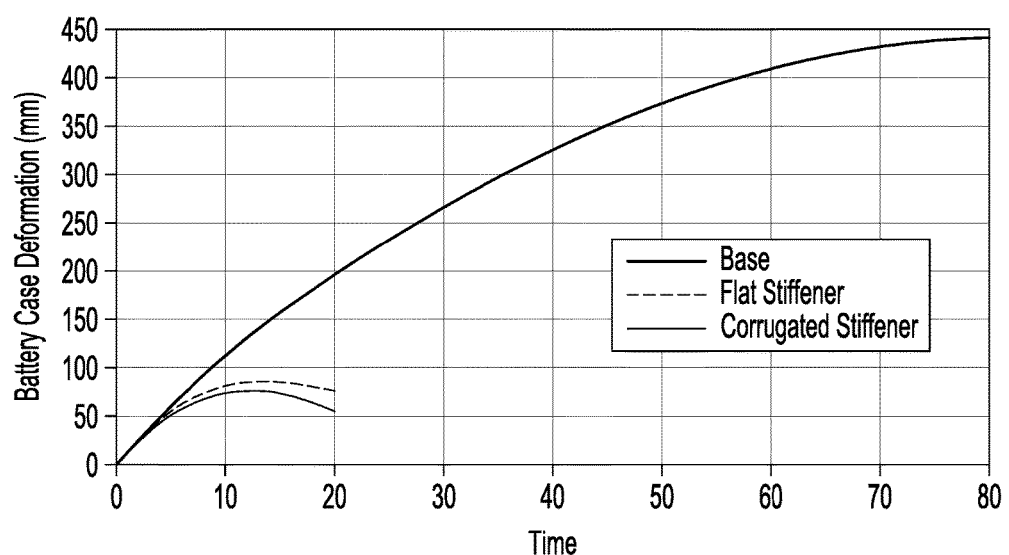
FIG. 8 is a graph of battery case deformation comparing the two different embodiments of the battery case having impact absorbing members made according to FIGS. 2 and 5, respectively.

Referring to FIG. 8, a graph illustrates the battery case deformation in millimeters over time. A simulated test result for a base steel battery enclosure made of 1.5 mm HSLA 450 steel having a mass of 52 kg as tested and was compared to each of the two embodiments described above. The test results for the embodiment illustrated in FIG. 2-4 with corrugated CFRP, of the battery enclosure 28 and shows that battery case deformation resulted in a maximum simulated battery deformation of slightly less than 75 mm over a period of 15 ms. The simulated test results for the embodiment illustrated in FIG. 5-7 of the battery enclosure 60 resulted in a maximum deformation of approximately 85 mm over a period of about 15 ms. Both of the battery enclosures 28 or 60 resulted in a marked reduction of battery case deformation compared to the base steel battery enclosure without the impact absorbing members 46 (or 76) that projected about 440 mm of crush over a period of 80 milliseconds.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of providing an impact absorbing battery enclosure for a battery of a vehicle having a battery powered traction motor comprising:
   providing a plurality of sides and a top side and a bottom side;
   assembling all of the sides together about the battery;
   assembling a plurality of impact absorbing carbon fiber reinforced polymer members to the plurality of sides to form an impact absorbing assembly that encloses the battery enclosure, wherein the impact absorbing carbon fiber reinforced polymer members are corrugated and have at least one ridge, a pair of adjacent of furrows, and a first ramp surface and a second ramp surface that each extend from the at least one ridge to the furrows on opposite sides of the at least one ridge and toward the side of the enclosure at an angle that define a trapezoidal space between the impact absorbing members and the sides of the enclosure;
   providing an attachment flange on a first side and a second side of the impact absorbing carbon fiber reinforced polymer members that extend parallel to one of the sides of the enclosure;
   connecting the attachment flange on the first side and on the second side to one of the sides of the enclosure;
   providing a plurality of T-shaped guides on one of the sides of the enclosure that define receptacles for the impact absorbing carbon fiber reinforced polymer members between two T-shaped guides that extend parallel to each other; and
   inserting each of the attachment flanges of the impact absorbing carbon fiber reinforced polymer members between one of the T-shaped guides and one of the sides of the enclosure.

2. The method of claim 1 wherein the impact absorbing members are adhesively attached to one of the sides of the enclosure.

* * * * *